(12) United States Patent
Wang

(10) Patent No.: US 9,206,916 B1
(45) Date of Patent: Dec. 8, 2015

(54) DUAL-PURPOSE TIRE INLET VALVE CONNECTOR

(71) Applicant: Wei-Chi Wang, Tainan (TW)

(72) Inventor: Wei-Chi Wang, Tainan (TW)

( * ) Notice: Subject to any disclaimer, the term of this patent is extended or adjusted under 35 U.S.C. 154(b) by 42 days.

(21) Appl. No.: 14/286,166

(22) Filed: May 23, 2014

(51) Int. Cl.
*F16K 15/20* (2006.01)
*F04B 33/00* (2006.01)

(52) U.S. Cl.
CPC ............... *F16K 15/207* (2013.01); *F04B 33/00* (2013.01); *F04B 33/005* (2013.01); *F16K 15/20* (2013.01); *Y10T 137/5196* (2015.04)

(58) Field of Classification Search
CPC ....... F16K 15/207; F16K 15/20; F04B 33/00; F04B 33/005; Y10T 137/3724; Y10T 137/5196
USPC .................................. 137/231, 223, 269, 270
See application file for complete search history.

(56) References Cited

U.S. PATENT DOCUMENTS

| | | | | |
|---|---|---|---|---|
| 6,146,116 A * | 11/2000 | Wu | ........................ | F04B 33/005 137/223 |
| 6,289,920 B1 * | 9/2001 | Wang | ........................ | B60S 5/04 137/223 |
| 7,866,335 B2 * | 1/2011 | Wang | ........................ | F16K 15/20 137/223 |
| 8,156,955 B2 * | 4/2012 | Wang | ........................ | F16K 15/20 137/223 |
| 8,720,474 B2 * | 5/2014 | Wang | ........................ | F04B 33/00 137/223 |
| 8,720,475 B2 * | 5/2014 | Wu | ........................ | F04B 33/00 137/223 |

* cited by examiner

*Primary Examiner* — Kevin Lee
(74) *Attorney, Agent, or Firm* — Shimokaji IP

(57) ABSTRACT

A dual-purpose tire inlet valve connector has a housing, a plunger mounted in a plunger chamber in the housing, multiple steel balls mounted around a periphery of the plunger, a push post and a compression spring mounted inside the plunger, multiple plunger springs mounted between the plunger and the housing, a pressing lever mounted on a top of the housing to abut against a top end of the plunger, and a sealing collar mounted on a bottom of the plunger chamber. The steel balls can be driven by the motion of the plunger and the springs activated by the pressing lever to hold the push post or release the push post for the plunger to abut against and position an American or French tire inlet valve inserted in the dual-purpose tire inlet valve connector to fulfill a universal and fast connection therewith and a smooth air-charging job.

16 Claims, 6 Drawing Sheets

DUAL-PURPOSE TIRE INLET VALVE CONNECTOR

BACKGROUND OF THE INVENTION

1. Field of the Invention

The present invention relates to a tire valve connector, and more particularly to a dual-purpose tire valve connector connected to an end portion of a connection hose of an air-charging device, such as air pump or air inflator and universally applied to American inlet valves or French inlet valves of tires.

2. Description of the Related Art

Typically, current inlet valves of tires can be classified into two types, namely, American inlet valves and French inlet valves. To inflate an American tire and a French tire, a conventional air-charging device, such as an air pump, an air inflator and the like, is equipped with a dual-purpose tire inlet valve connector connected to an end portion of a connection hose of the air-charging device.

A conventional tire inlet valve connector includes a body, a nozzle, a pressing lever and a clamping seat. The body has a mounting hole therein and an inlet tube formed on the body, extending in a direction oblique relative to the mounting hole and communicating with the mounting hole. The nozzle is mounted in a bottom end of the mounting hole of the body. The pressing lever and the clamping seat are mounted in a top portion of the mounting hole. The clamping seat has a guiding hole formed at a bottom portion thereof and tapered downwards. A plunger is slidably mounted in the mounting hole to move up and down between the pressing lever and the clamping seat. A restoring spring is mounted between the plunger and the clamping seat such that the plunger can be pressed to move downwards by the pressing lever. The plunger has an axial hole formed on and recessed upwards from a bottom of the plunger. A spring is mounted in the axial hole and a bottom end of the spring is connected with a push post. The push post may stick out of the bottom of the plunger and penetrate into the clamping seat and the nozzle. Multiple movable claws are formed on a bottom end of the plunger to correspond to the guiding hole of the clamping seat, and provide elastic restoring force in a radial direction such that the claws have a holding effect as being limited by the guiding hole when the plunger is pressed by pressing lever to go down. When continuously going down, the plunger squeezes the nozzle to deform and hold a tire inlet valve. Accordingly, the foregoing conventional tire inlet valve connector is applicable to a dual-purpose tire inlet valve connector for American tire inlet value and French tire inlet valve.

In the foregoing tire inlet valve connector, the pressing lever is used to drive the plunger to go down, the claws are guided by the guiding hole of the clamping seat to jointly hold the push post to go down for the push post to be pressed on a valve core of an American tire inlet valve mounted in the nozzle. Alternatively, the push post is pressed on a French tire inlet valve mounted in the plunger sequentially through the nozzle and the clamping seat. However, after the plunger is operated for a period of time, reduced elasticity of the claws of the plunger arises from elastic fatigue of the claws and leads to unsmooth movement of the push post and malfunction of the conventional tire inlet valve connector upon connection with an American tire inlet valve or a French tire inlet valve.

SUMMARY OF THE INVENTION

An objective of the present invention is to provide a dual-purpose tire inlet valve connector tackling the reduced elasticity of the movable claws in the conventional dual-purpose tire inlet valve connector.

To achieve the foregoing objective, the dual-purpose tire inlet valve connector has a housing, a pressing lever, a sealing collar, a plunger, at least one plunger spring, multiple steel balls, a push post and a compression spring.

The housing has a plunger chamber and a tunnel.

The plunger chamber is formed through the housing in a top-down direction and has a top opening, a bottom opening, an upper wall and a lower wall. An inner diameter of the lower wall is smaller than an inner diameter of the upper wall.

The tunnel is longitudinally formed through a lateral portion of the housing and communicates with a portion of the plunger chamber surrounded by the upper wall.

The pressing lever has a handle portion and a pressing portion.

The pressing portion is formed on one end of the handle portion, and is pivotally mounted in a top portion of the housing by a pin eccentrically mounted through the pressing portion and the housing to correspond to the top opening of the plunger chamber of the housing.

The sealing collar is mounted inside the plunger chamber to correspond to the lower wall of the plunger chamber, and has a valve insertion mouth communicating with the plunger chamber of the housing.

The plunger is mounted inside the plunger chamber for upward and downward movement therein, is located between the sealing collar and the pressing lever, and has a shank and a pressurized end.

The shank has an outer diameter corresponding to an inner diameter of the lower wall of the plunger chamber, is spaced apart from the upper wall of the plunger chamber by gaps, and has a cavity, multiple ball holes and at least one air hole.

The cavity is formed in the shank and has an opening facing down.

The ball holes are formed through a periphery of the shank and communicate with the cavity.

The at least one air hole is formed through a periphery of the shank and communicates with the cavity.

The pressurized end is formed on a top portion of the shank and contacts the pressing portion of the pressing lever. The at least one air hole is located between the ball holes and the pressurized end.

The air-tight ring is mounted around a periphery of the pressurized end and hermetically seals the plunger chamber.

The at least one plunger spring is mounted between the top portion of the housing and the pressurized end of the plunger.

The steel balls are respectively mounted in the ball holes of the plunger and are pushed into the cavity of the shank through the respective ball holes when the plunger is moved down to the lower wall of the plunger chamber.

The push post is movably mounted in the cavity of the plunger for upward and downward movement and has a stem, a head, a through hole and a valve end. The stem is movable in and out the valve insertion mouth of the sealing collar.

The head is formed on a top end of the stem.

The through hole is axially formed through the push post, and communicates with the cavity of the plunger.

The valve end is formed on a bottom end of the stem.

The compression spring is mounted inside the cavity of the plunger and has a top end and a bottom end respectively abutting against the head of the push post and the upper wall of the plunger chamber.

Given the foregoing structure of the dual-purpose tire inlet valve connector, when the pressing lever is pulled down or positioned at a state not pressing the plunger, the plunger and the push post therein are driven by the elastic force of the plunger springs and the compression spring to keep the steel balls holding the push post to position an American tire inlet valve or releasing the push post for the plunger to position a French tire inlet valve inserted in the dual-purpose tire inlet valve connector to fulfill a universal and fast connection therewith and a stable air-charging job under a cost-effective premise.

Other objectives, advantages and novel features of the invention will become more apparent from the following detailed description when taken in conjunction with the accompanying drawings.

DETAILED DESCRIPTION OF THE INVENTION

Figure 1:
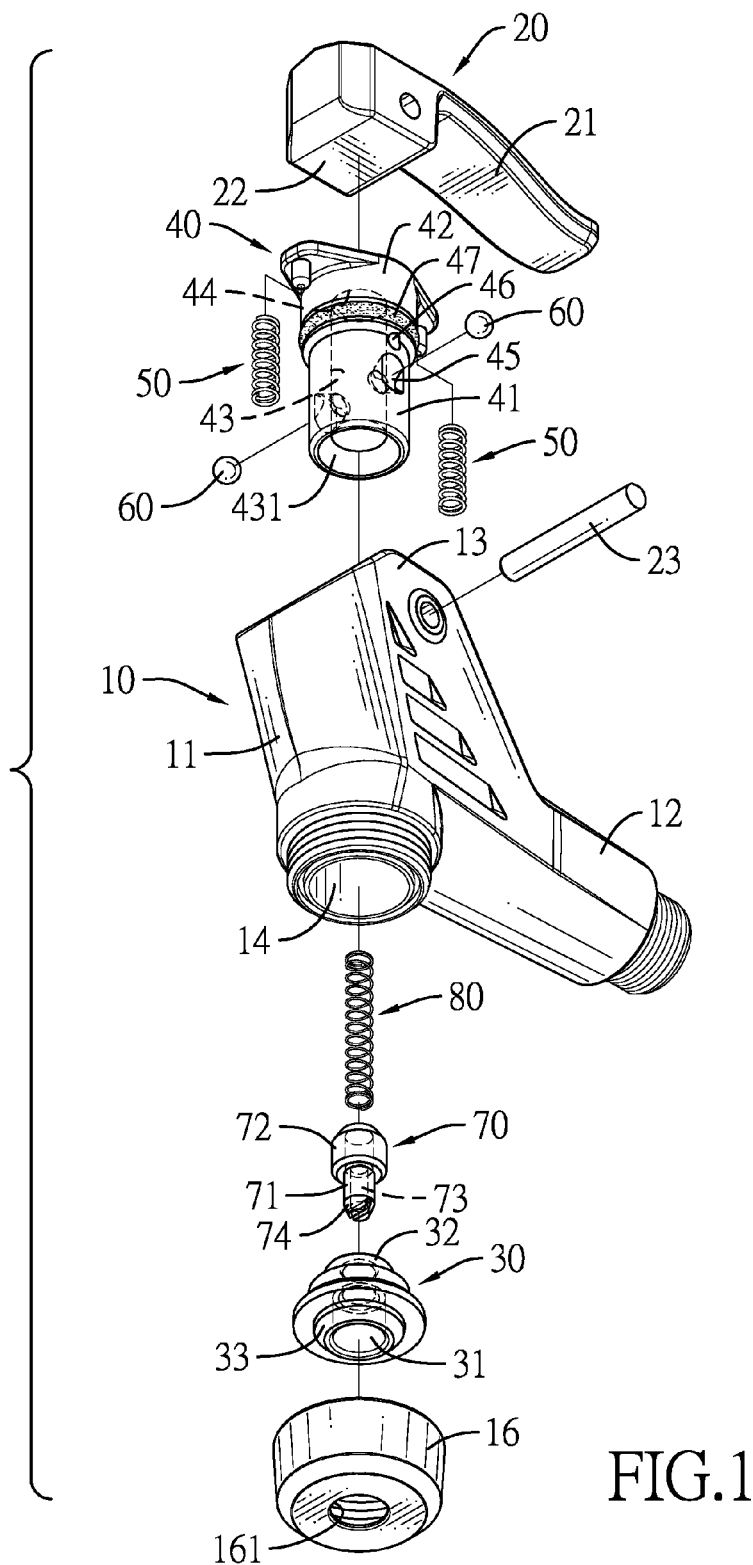
FIG. 1 is an exploded perspective view of a dual-purpose tire inlet valve connector in accordance with the present invention.
Figure 2:
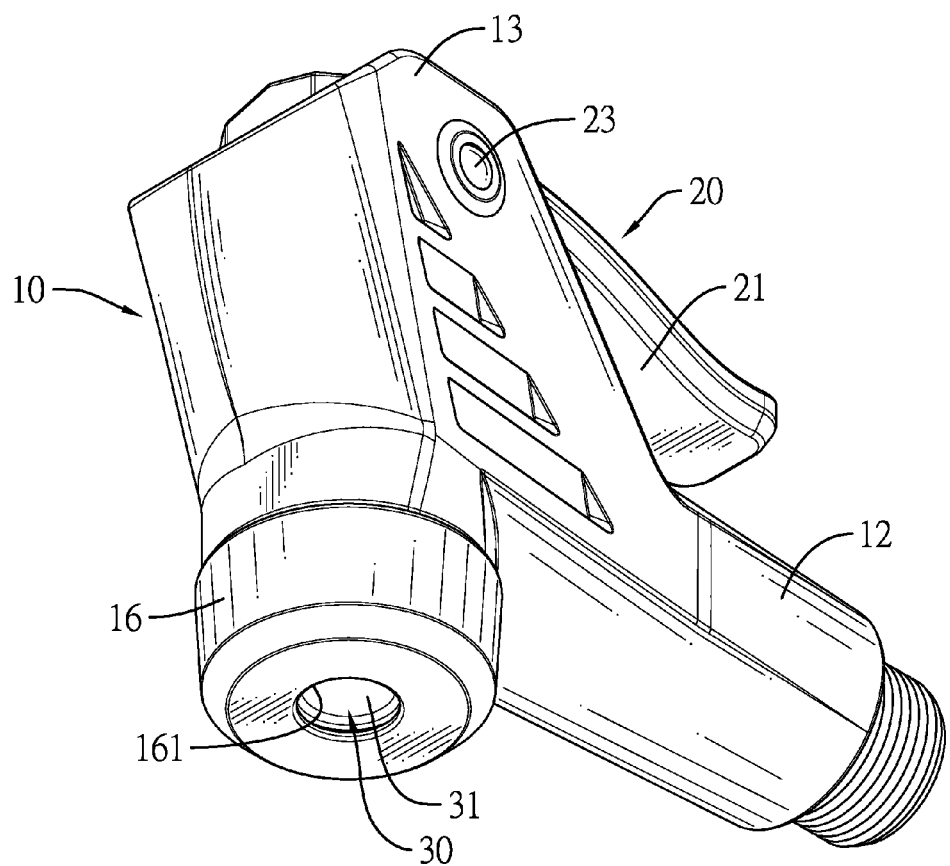
FIG. 2 is a perspective view of the dual-purpose tire inlet valve connector in FIG. 1.

With reference to FIGS. 1 and 2, a dual-purpose tire inlet valve connector in accordance with the present invention has a housing 10, a pressing lever 20, a sealing collar 30, a plunger 40, at least one plunger spring 50, multiple steel balls 60, a push post 70 and a compression spring 80.

Figure 3:
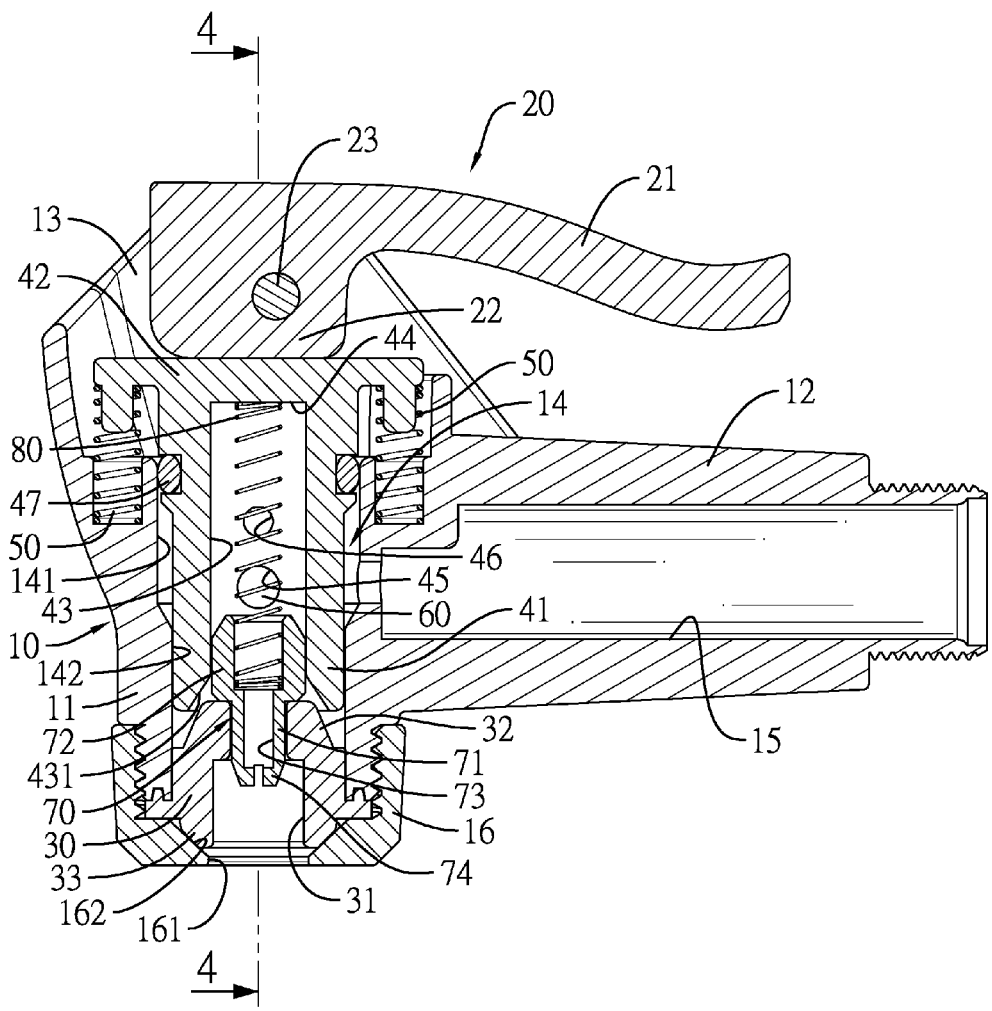
FIG. 3 is a cross-sectional side view of the dual-purpose tire inlet valve connector in FIG. 2.
Figure 4:
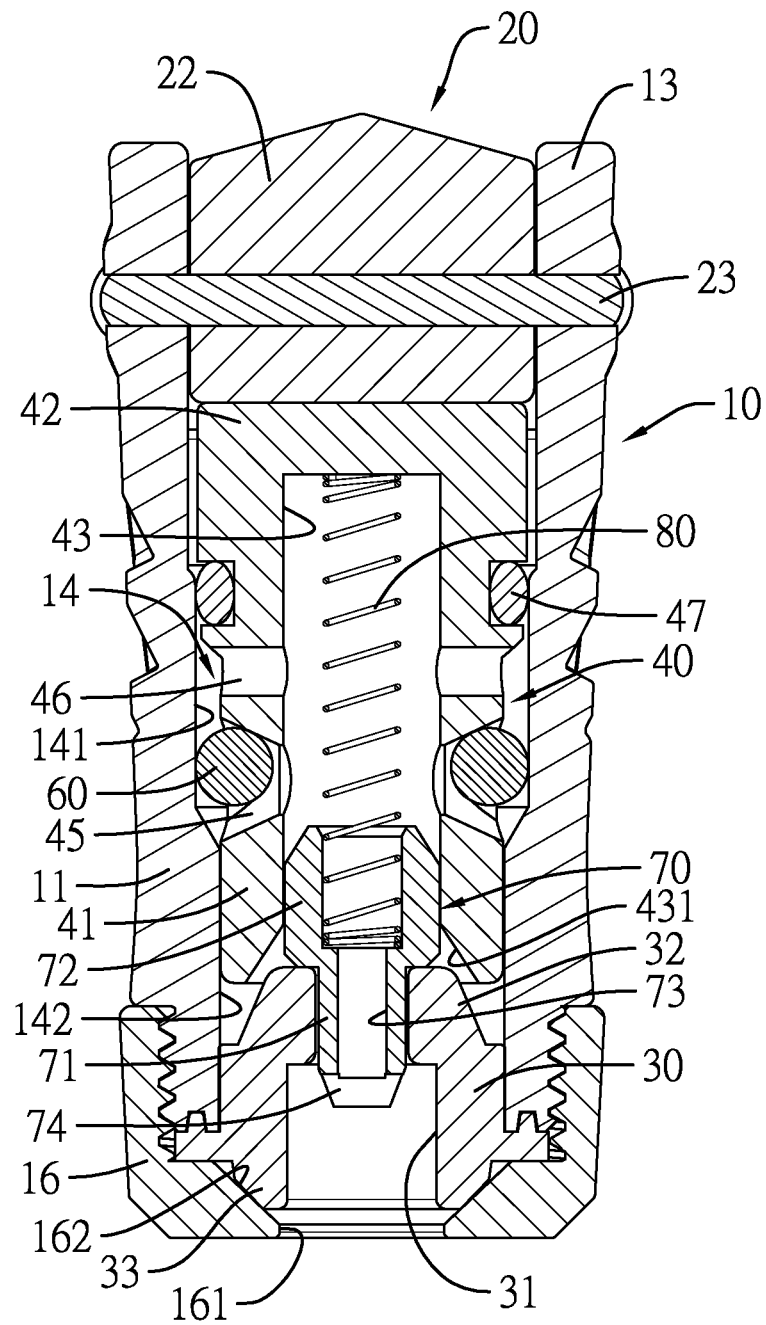
FIG. 4 is a cross-sectional front view of the dual-purpose tire inlet valve connector along line 4-4 in FIG. 3.

With reference to FIGS. 1, 3 and 4, the housing 10 has a trunk portion 11, a charging connection portion 12 and a pivot portion 13. The trunk portion 11 has a plunger chamber 14 defined therein. The plunger chamber 14 has a top opening and a bottom opening. The plunger chamber 14 has an upper wall 141 and a lower wall 142. The upper wall 141 is larger than the lower wall 142 in inner diameter. The charging connection portion 12 is formed on and protrudes outwards from a periphery of the trunk portion 11, and has a tunnel 15 longitudinally formed through the charging connection portion 12, communicating with the plunger chamber 14, and having two ends including a free end. One free end of the tunnel 15 serves as an air inlet and the other end is directed to the upper wall 141 of the plunger chamber 14. The pivot portion 13 is formed on a top portion of the trunk portion 11 and is adjacent to the top opening of the plunger chamber 14.

The pressing lever 20 has a handle portion 21 and a pressing portion 22. The pressing portion 22 is formed on one end of the handle portion 21, and is pivotally mounted in the pivot portion 13 by a pin 23 eccentrically mounted through the pressing portion 22 and the pivot portion 13 of the housing 10 to correspond to the top opening of the plunger chamber 14 of the housing 10.

The sealing collar 30 may be made of soft and resilient material, such as rubber, is mounted inside the plunger chamber 14 to correspond to the lower wall 142 of the plunger chamber 14, and has a valve insertion mouth 31, a conic head 32 and a conic bottom 33. The valve insertion mouth 31 communicates with the plunger chamber 14 of the housing 10, and corresponds to an end of an American or French tire inlet valve with an air inlet. In the present embodiment, the valve insertion mouth 31 has a step hole with a top inner wall and a bottom inner wall. The bottom inner wall is greater than the top inner wall in diameter. The conic head 32 is formed on a top portion of the sealing collar 30 that is inserted into the plunger chamber 14 of the housing 10, and is tapered upwards. The conic bottom 33 is formed on a bottom portion of the sealing collar 30, and is tapered downwards. When the conic head 32 or the conic bottom 33 is squeezed, the conic head 32 or the conic bottom 33 is contracted inwards to increase a holding force on the American or French tire inlet valve mounted in the valve insertion mouth 31.

The housing 10 further has an annular cap 16 mounted around a lower portion of trunk portion 11 to fasten the sealing collar 30 inside the bottom opening of the plunger chamber 14. The annular cap 16 has a central hole 161 formed through the annular cap 16 and communicating with the valve insertion mouth 31 of the sealing collar 30. In the present embodiment, the annular cap 16 and the lower portion of the trunk portion 11 are combined by threaded connection. The central hole 161 has a conic inner wall 162 expanding upwards in diameter and combined with the conic bottom 33 of the sealing collar 30 by conical connection.

The plunger 40 has a shank 41, a pressurized end 42 and an air-tight ring 47. An outer diameter of the shank 41 corresponds to a relatively-smaller inner diameter of the lower wall 142 of the plunger chamber 14 of the housing 10. A periphery of the shank 41 and the upper wall 141 of the plunger chamber 14 are spaced apart with gaps. The shank 41 has a cavity 43, an abutting wall 44, multiple ball holes 45 and at least one air hole 46. The cavity 43 is formed in the shank 41 and has a conic opening 431 facing down, expanding downwards in diameter, and corresponding to the conic head 32 of the sealing collar 30. The abutting wall 44 is located on a top end of the cavity 43. The ball holes 45 are formed through a central portion of the periphery of the shank 41 and communicate with the cavity 43. Preferably, the ball holes 45 are tapered in a direction into the periphery of the shank. The at least one air hole 46 is formed through a portion of the periphery of the shank 41 between the ball holes 45 and the pressurized end 42 and communicates with the cavity 43 such that the cavity 43 communicates with the tunnel 15 of the charging connection portion 12 through the at least one air hole 46 and the gap between the upper wall 141 of the plunger chamber 14 and the shank 41. The pressurized end 42 is formed on a top portion of the top opening of the plunger chamber 14 and contacts the pressing portion 22 of the pressing lever 20. The air-tight ring 47 is mounted around a periphery of the pressurized end 42 of the plunger 40. The plunger 40 and the air-tight ring 47 are movably mounted in the plunger chamber 14 to move in an axial direction and are located above the sealing collar 30. The air-tight ring 47 is movable on a portion of the upper wall 141 of the plunger chamber 14 above the tunnel 15 of the charging connection portion 12. The air-tight ring 47 forms hermetic seal between the upper wall 141 and the pressurized end 42.

The steel balls 60 are respectively mounted in the ball holes 45 of the plunger 40. A diameter of each steel ball 60 is greater than a wall thickness of the shank 41 of the plunger 40 such that the steel balls 60 can be pushed into the cavity 43 through the respective ball holes 45 when the plunger 40 is moved down to the lower wall 142 of the plunger chamber 14.

The at least one plunger spring 50 is mounted between the top portion of the trunk portion 11 and the pressurized end 42 of the plunger 40. In the present embodiment, the at least one plunger spring 50 includes multiple plunger springs 50.

The push post 70 has a stem 71, a head 72, a through hole 73 and a valve end 74. The head 72 is formed on a top end of the stem 71. An outer diameter of head 72 is larger than that of the stem 71 and corresponds to an inner diameter of the cavity 43. An outer diameter of the stem 71 corresponds to an inner diameter of the valve insertion mouth 31 of the sealing collar 30. The through hole 73 is axially formed through the push post 70, communicates with the cavity 43 of the plunger 40, and may be a stepped hole reduced downwards in diameter in a stepwise manner. The valve end 74 is formed on a bottom end of the stem 71, is tapered downwards, and has a notch formed through the valve end 74 to communicate with the through hole 73. The push post 70 is axially and movably mounted in the cavity 43 of the plunger 40. The stem 71 of the push post 70 can be inserted into and pulled out of the valve insertion mouth 31 of the sealing collar 30. In the present embodiment, the head 72 of the push post 70 is conic and is tapered upwards for reducing conflict between the push post 70 and the steel balls 60 when the push post 70 is moved up and down.

The compression spring 80 is mounted inside the cavity 43 of the plunger 40. A top end and a bottom end of the compression spring 80 respectively abut against the push post 70 and the abutting wall 44 of the plunger 40.

Figure 5:
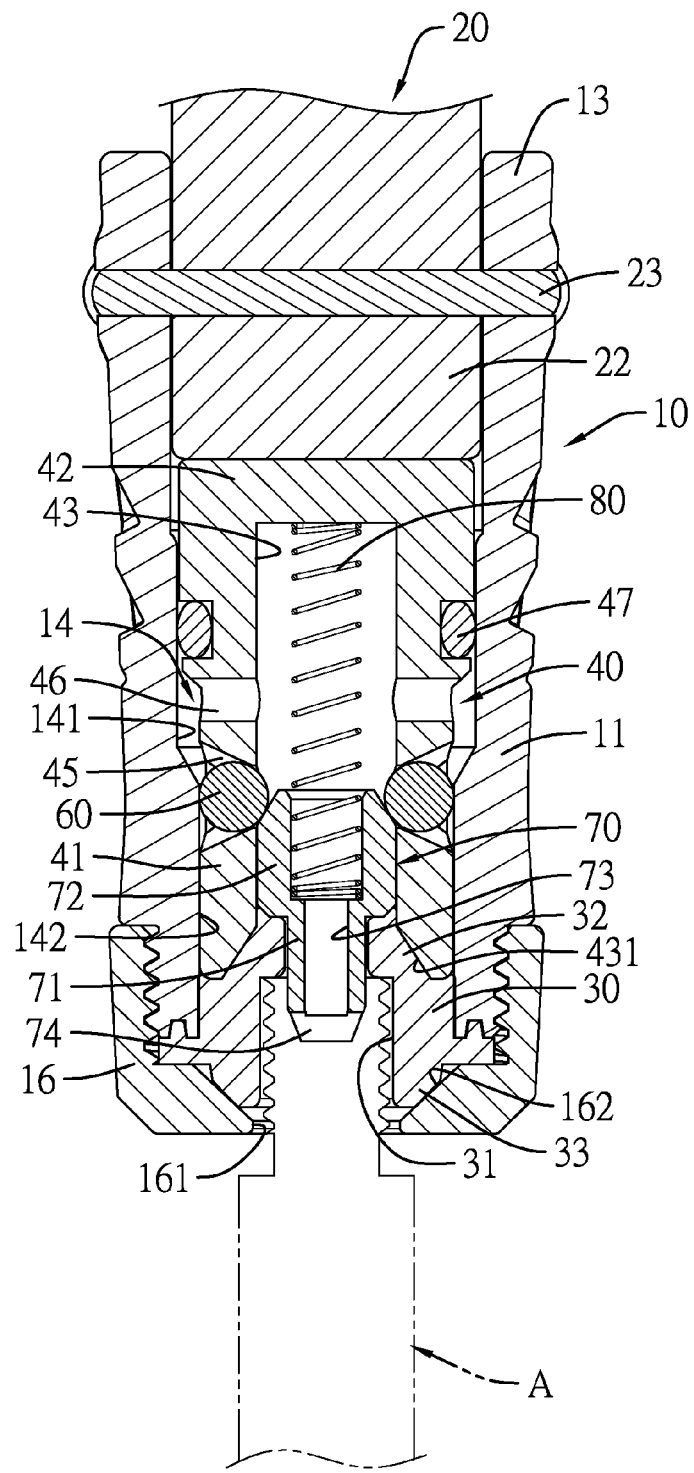
FIG. 5 is an operational cross-sectional front view of the dual-purpose tire inlet valve connector in FIG. 4 when connected with an American tire inlet valve.

With reference to FIGS. 3 and 5, when the dual-purpose tire inlet valve connector is in use, a free end of the charging connection portion 12 of the housing 10 is connected to a connection hose of an air-charging device. Suppose that an American tire inlet valve A is the one to be connected with. An inlet end of the valve core of the American tire inlet valve A is inserted into the valve insertion mouth 31 of the sealing collar 30, and the pressing lever 20 is pulled down such that the pressing portion 22 of the pressing lever 20 abuts against the plunger 40 to exert a downward pressing force thereon. Subjected to the downward force, the plunger 40 compresses the plunger springs 50 and is moved toward the sealing collar 30. As the lower wall 142 of the plunger chamber 14 of the housing 10 has a smaller diameter than that of the upper wall 141, the steel balls 60 mounted around the shank 41 of the plunger 40 are compressed by the lower wall 142 and are radially moved in an inward direction. A part of each steel ball 60 protrudes into the cavity 43 through a corresponding ball hole 45 and holds the head 72 of the push post 70. When the push post 70 is subjected to the pressing force exerted by the steel balls 60 and the elastic force of the compression spring 80, the valve end 74 of the push post 70 is pushed to open the valve core of the American tire inlet valve A. When the pressing lever 20 is pulled down to push the plunger 40 to move downwards, a downward pressing force is exerted on the sealing collar 30 by the plunger 40 and the conic bottom 33 of the sealing collar 30 further squeezes the conic inner wall 162 of the annular cap 16. A bottom portion of the sealing collar 30 is thus contracted inwards to increase a clamping force on the American tire inlet valve A. Accordingly, the American tire inlet valve A can be effectively operated in the subsequent air-charging process without having leakage or the issue that the American tire inlet valve A is bounced off by the high-pressure charging gas.

When outputted through the connection hose of the air-charging device into the dual-purpose tire inlet valve connector, the pressurized gas sequentially passes through the plunger chamber 14, the at least one air hole 46 of the plunger 40, the cavity 43, the through hole 73 of the push post 70 and the American tire inlet valve A to charge a tire. After the charging is done, the pressing lever 20 is pressed down and the dual-purpose tire inlet valve connector is detached from the American tire inlet valve A.

Figure 6:
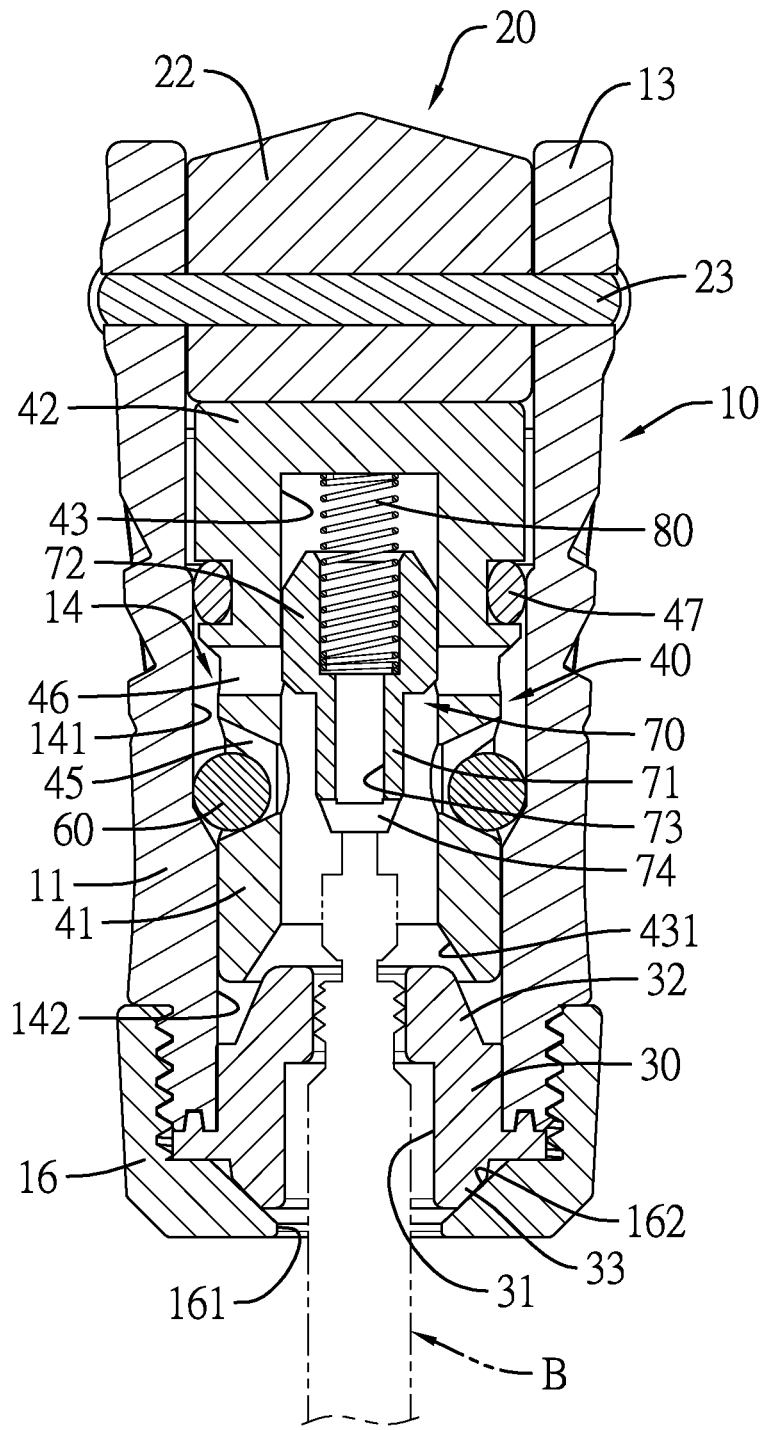
FIG. 6 is an operational cross-sectional front view of the dual-purpose tire inlet valve connector in FIG. 4 when connected with a French tire inlet valve.

With reference to FIGS. 3 and 6, when the dual-purpose tire inlet valve connector is connected with a French tire inlet valve B, an inlet end of the valve core of the French tire inlet valve B is inserted into the valve insertion mouth 31 of the sealing collar 30 and further extends into the plunger chamber 14 of the plunger 40 to push the push post 70 upwards. Meanwhile, the pressing lever 20 is positioned at a state not pressing the plunger 40 and the steel balls 60 on the periphery of the plunger 40 are positioned on the upper wall 141 of the plunger chamber 14 with a larger diameter and have more room for movement. Hence, when the push post 70 is propped up, the steel balls 60 are moved outwards such that the push post 70 is not held by the steel balls 60 and the inlet end of the valve core of the French tire inlet valve B can reach to an appropriate position inside the plunger 40. The push post 70 is subjected to a downward elastic force of the compression spring 80 for the valve end 74 of the push post 70 to push open the valve core of the French tire inlet valve B. Furthermore, when the pressing lever is pulled down to press the plunger to move downwards, a bottom of the plunger 40 abuts against the conic head 32 on the top portion of the sealing collar 30 such that the sealing collar 30 is contracted inwards due to the downward pressing force and a clamping force on the French tire inlet valve B is increased. Accordingly, the French tire inlet valve B can be effectively operated in the subsequent air-charging process without having leakage or the issue that the French tire inlet valve B is bounced off by the high-pressure charging gas.

When outputted through the connection hose of the air-charging device into the dual-purpose tire inlet valve connector, the pressurized gas sequentially passes through the tunnel 15 of the housing 10, the plunger chamber 14, the at least one air hole 46 on the periphery of the plunger 40, the cavity 43, the through hole 73 of the push post 70 and the French tire inlet valve B to charge a tire. After the charging is done, the dual-purpose tire inlet valve connector is detached from the French tire inlet valve B and the push post 70 is moved downwards to return back in the sealing collar 30 due to the restoring force of the compression spring 80.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:
1. A dual-purpose tire inlet valve connector, comprising:
 a housing having
  a plunger chamber formed through the housing in a top-down direction and having a top opening, a bottom opening, an upper wall and a lower wall, wherein an inner diameter of the lower wall is smaller than an inner diameter of the upper wall; and
  a tunnel longitudinally formed through a lateral portion of the housing and communicating with a portion of the plunger chamber surrounded by the upper wall;
 a pressing lever having
  a handle portion; and
  a pressing portion formed on one end of the handle portion, and pivotally mounted in a top portion of the housing by a pin eccentrically mounted through the pressing portion and the housing to correspond to the top opening of the plunger chamber of the housing;
 a sealing collar mounted inside the plunger chamber to correspond to the lower wall of the plunger chamber, and having a valve insertion mouth communicating with the plunger chamber of the housing;

a plunger mounted inside the plunger chamber for upward and downward movement therein, located between the sealing collar and the pressing lever, and having
  a shank having an outer diameter corresponding to the inner diameter of the lower wall of the plunger chamber, spaced apart from the upper wall of the plunger chamber by gaps, and having
    a cavity formed in the shank and having an opening facing down;
    multiple ball holes formed through a periphery of the shank and communicating with the cavity; and
    at least one air hole formed through the periphery of the shank and communicating with the cavity;
  a pressurized end formed on a top portion of the shank and contacting the pressing portion of the pressing lever, wherein the at least one air hole is located between the ball holes and the pressurized end; and
  an air-tight ring mounted around a periphery of the pressurized end and hermetically sealing the plunger chamber;
at least one plunger spring mounted between a top portion of the housing and the pressurized end of the plunger;
multiple steel balls respectively mounted in the ball holes of the plunger and pushed into the cavity of the shank through the respective ball holes when the plunger is moved down to the lower wall of the plunger chamber;
a push post movably mounted in the cavity of the plunger for upward and downward movement and having
  a stem being movable in and out the valve insertion mouth of the sealing collar;
  a head formed on a top end of the stem;
  a through hole axially formed through the push post, and communicating with the cavity of the plunger; and
  a valve end formed on a bottom end of the stem; and
a compression spring mounted inside the cavity of the plunger and having a top end and a bottom end respectively abutting against the head of the push post and the upper wall of the plunger chamber.

2. The dual-purpose tire inlet valve connector as claimed in claim 1, wherein
  the housing further has:
    a trunk portion having the plunger chamber defined therein;
    a charging connection portion formed on and protruding outwards from a periphery of the trunk portion, and having the tunnel;
    a pivot portion formed on a top portion of the trunk portion and adjacent to the top opening of the plunger chamber; and
    an annular cap mounted around a lower portion of the trunk portion to fasten the sealing collar inside the bottom opening of the plunger chamber and having a central hole formed through the annular cap and communicating with the valve insertion mouth of the sealing collar; and
  the pressing portion of the pressing lever is pivotally mounted in the pivot portion of the housing.

3. The dual-purpose tire inlet valve connector as claimed in claim 2, wherein multiple plunger springs are mounted between the top portion of the trunk portion and the pressurized end of the plunger.

4. The dual-purpose tire inlet valve connector as claimed in claim 1, wherein the ball holes are tapered in a direction into the periphery of the shank.

5. The dual-purpose tire inlet valve connector as claimed in claim 2, wherein the ball holes are tapered in a direction into the periphery of the shank.

6. The dual-purpose tire inlet valve connector as claimed in claim 3, wherein the ball holes are tapered in a direction into the periphery of the shank.

7. The dual-purpose tire inlet valve connector as claimed in claim 2, wherein
  the sealing collar further has a conic head formed on a top portion of the sealing collar that is inserted into the plunger chamber of the housing and being tapered upwards;
  the cavity of the plunger has a conic opening expanding downwards in diameter and corresponding to the conic head of the sealing collar;
  the sealing collar further has a conic bottom formed on a bottom portion of the sealing collar and being tapered downwards; and
  the central hole of the annular cap has a conic inner wall expanding upwards in diameter and combined with the conic bottom of the sealing collar by conical connection.

8. The dual-purpose tire inlet valve connector as claimed in claim 3, wherein
  the sealing collar further has a conic head formed on a top portion of the sealing collar that is inserted into the plunger chamber of the housing and being tapered upwards;
  the cavity of the plunger has a conic opening expanding downwards in diameter and corresponding to the conic head of the sealing collar;
  the sealing collar further has a conic bottom formed on a bottom portion of the sealing collar and being tapered downwards; and
  the central hole of the annular cap has a conic inner wall expanding upwards in diameter and combined with the conic bottom of the sealing collar by conical connection.

9. The dual-purpose tire inlet valve connector as claimed in claim 1, wherein
  the through hole of the push post is a stepped hole reduced downwards in diameter in a stepwise manner;
  the valve end of the push post is tapered downwards and has a notch formed through the valve end to communicate with the through hole; and
  the head of the push post is conic and is tapered upwards.

10. The dual-purpose tire inlet valve connector as claimed in claim 2, wherein
  the through hole of the push post is a stepped hole reduced downwards in diameter in a stepwise manner;
  the valve end of the push post is tapered downwards and has a notch formed through the valve end to communicate with the through hole; and
  the head of the push post is conic and is tapered upwards.

11. The dual-purpose tire inlet valve connector as claimed in claim 3, wherein
  the through hole of the push post is a stepped hole reduced downwards in diameter in a stepwise manner;
  the valve end of the push post is tapered downwards and has a notch formed through the valve end to communicate with the through hole; and
  the head of the push post is conic and is tapered upwards.

12. The dual-purpose tire inlet valve connector as claimed in claim 1, wherein
  the ball holes are tapered in a direction into the periphery of the shank;
  the through hole of the push post is a stepped hole reduced downwards in diameter in a stepwise manner;
  the valve end of the push post is tapered downwards and has a notch formed through the valve end to communicate with the through hole; and
  the head of the push post is conic and is tapered upwards.

13. The dual-purpose tire inlet valve connector as claimed in claim 2, wherein
- the ball holes are tapered in a direction into the periphery of the shank;
- the through hole of the push post is a stepped hole reduced downwards in diameter in a stepwise manner;
- the valve end of the push post is tapered downwards and has a notch formed through the valve end to communicate with the through hole; and
- the head of the push post is conic and is tapered upwards.

14. The dual-purpose tire inlet valve connector as claimed in claim 3, wherein
- the ball holes are tapered in a direction into the periphery of the shank;
- the through hole of the push post is a stepped hole reduced downwards in diameter in a stepwise manner;
- the valve end of the push post is tapered downwards and has a notch formed through the valve end to communicate with the through hole; and
- the head of the push post is conic and is tapered upwards.

15. The dual-purpose tire inlet valve connector as claimed in claim 7, wherein
- the ball holes are tapered in a direction into the periphery of the shank;
- the through hole of the push post is a stepped hole reduced downwards in diameter in a stepwise manner;
- the valve end of the push post is tapered downwards and has a notch formed through the valve end to communicate with the through hole; and
- the head of the push post is conic and is tapered upwards.

16. The dual-purpose tire inlet valve connector as claimed in claim 8, wherein
- the ball holes are tapered in a direction into the periphery of the shank;
- the through hole of the push post is a stepped hole reduced downwards in diameter in a stepwise manner;
- the valve end of the push post is tapered downwards and has a notch formed through the valve end to communicate with the through hole; and
- the head of the push post is conic and is tapered upwards.

* * * * *